United States Patent [19]

Katz

[11] Patent Number: 4,460,059
[45] Date of Patent: Jul. 17, 1984

[54] METHOD AND SYSTEM FOR SEISMIC CONTINUOUS BIT POSITIONING

[76] Inventor: Lewis J. Katz, 3521 Westwood Dr., Salt Lake City, Utah 84109

[21] Appl. No.: 397,890

[22] Filed: Jul. 13, 1982

Related U.S. Application Data

[63] Continuation of Ser. No. 001,079, Jan. 4, 1979, abandoned.

[51] Int. Cl.$^3$ ............................................. E21B 47/022
[52] U.S. Cl. ..................................... 181/102; 367/33; 175/40
[58] Field of Search .................... 367/14, 30, 33, 56, 367/57, 58, 59, 69, 81, 86, 83; 181/102, 106; 175/45, 40; 340/853, 860

[56] References Cited

U.S. PATENT DOCUMENTS

| | | | |
|---|---|---|---|
| Re. 18,565 | 8/1932 | Rosaire | 367/33 |
| 2,062,151 | 11/1936 | Weatherby | 367/86 |
| 2,933,144 | 4/1960 | Scott et al. | 367/81 |
| 3,208,549 | 9/1965 | Alexander et al. | 367/25 |
| 3,249,911 | 5/1966 | Gustafson | 367/125 |
| 3,614,891 | 9/1971 | Nolte | 73/151 |
| 3,790,930 | 2/1974 | Lamel et al. | 367/82 |
| 3,817,345 | 6/1974 | Bailey | 367/86 |
| 3,876,016 | 4/1975 | Stinson | 175/45 |
| 3,881,168 | 4/1975 | Farr et al. | 367/48 |
| 3,933,974 | 1/1976 | Silverman et al. | 181/102 |
| 3,947,803 | 3/1976 | Brown | 367/125 |
| 3,963,093 | 6/1976 | Morris | 181/122 |
| 3,979,140 | 9/1976 | Silverman et al. | 367/14 |
| 3,979,724 | 9/1976 | Silverman et al. | 181/106 |
| 3,980,986 | 9/1976 | Baird et al. | 175/45 |
| 4,001,773 | 1/1977 | Lamel et al. | 367/82 |
| 4,003,017 | 1/1977 | Bailey | 367/81 |
| 4,033,429 | 7/1977 | Farr | 181/106 |
| 4,040,003 | 8/1977 | Beynet et al. | 181/106 |
| 4,144,949 | 3/1979 | Silverman | 181/106 |

OTHER PUBLICATIONS

Capon et al., "Short-Period Signal Processing Results for the Large Aperture Seismic Array", Geophysics, vol. 33, No. 3, (Jun. 1968), pp. 352-372.

Niedell and Tanner, Semblance and Other Coherence Measures for Multi-Channel Data", Geophysics, vol. 36, No. 3, (Jun. 1971), pp. 482-496.

Lutz et al., "Instantaneous Logging Based on a Dynamic Theory of Drilling", paper presented at Society of Petroleum Engineers 46th Annual Fall Meeting, Oct. 3-6, 1971, printed in Transactions, vol. 253, 1972.

Power et al., "Detection of Hydraulic Fracture Orientation and Dimensions in Cased Wells", *Journal of Petroleum Technology*, Sep. 1976, pp. 1116-1124.

*Primary Examiner*—S. C. Buczinski
*Assistant Examiner*—K. R. Kaiser
*Attorney, Agent, or Firm*—Banner, Birch, McKie & Beckett

[57] ABSTRACT

The specification discloses a method and system for determining the position of a drill bit in the earth without interrupting the drilling operations. In operation, rotation of the drill bit against the formation being drilled generates coherent acoustical signals which are recorded at the surface of the earth by a plurality of spaced detectors. The signals recorded at each of the different detectors are time shifted relative to each other. These time shifts correspond to possible locations of the drill bit within the earth and are controlled to some degree by the length of drill pipe in the borehole. After the acoustic signals are shifted in time their coherency is determined. This procedure is repeated for a number of assumed locations of the drill bit. The drill bit position is determined to be at the location having the highest coherency value. In this manner the surface detectors are focused on precise positions within the earth avoiding interference from acoustical signals generated at the surface or from the drill pipe.

30 Claims, 2 Drawing Figures

METHOD AND SYSTEM FOR SEISMIC CONTINUOUS BIT POSITIONING

This is a continuation of application Ser. No. 001,079, filed Jan. 4, 1979, now abandoned.

BACKGROUND OF THE INVENTION

1. Field of the Invention

This invention relates to a method of and system for determining the three dimensional position of the bottom of a borehole and which permit these positions to be determined continuously or at discrete intervals as the borehole is advanced without interrupting the drilling process.

2. Description of Prior Art

In conventional rotary drilling operations the direction and position of the bottom of a borehole with respect to its surface location is determined by suspending drilling operations and lowering suitable tools into the borehole to obtain the desired information. Time lost from suspending drilling operations to make these measurements is extremely expensive.

In U.S. Pat. Nos. 2,062,151 and 3,187,345 the drill bit is dropped several feet to generate a discrete acoustical wave that can be detected at the surface. The disadvantage in these systems is that drillers are reluctant to drop the drill bit because of damage that is likely to occur to the bit. Also, mentioned in U.S. Pat. No. 2,062,151 is the use of elastic waves produced by the action of a rotary cutting tool on the formation in which it is drilling to determine the position of the bottom of the borehole.

In actual practice, the elastic waves produced by the action of a rotary drill bit are quite complex making visual comparisons of waveforms impractical, especially in the presence of noise generated by surface equipment and the action of the drill string rotating against the sides of the borehole. Hence, it would be practically impossible to visually distinguish waveforms and to segregate those acoustical signals generated by the drill bit from those caused by surface noise or the drill string.

SUMMARY OF THE INVENTION

By focusing an array of acoustical detectors which are located at the surface of the earth on precise positions within the earth, the location of a drill bit that generates coherent acoustical signals can be determined. Thus, by focusing detectors on locations corresponding to a depth within the earth determined by the length of drill pipe down the borehole, the acoustical signal generated by the drill bit can be segregated from other acoustical signals that interfere with the desired signal. In this manner limitations of the prior art are overcome in this invention.

Accordingly, it is an object of the present invention to provide an improved method and system for determining the position of the bottom of a borehole by focusing an array of acoustical detectors on selected positions within the earth to separate out acoustical noise signals arriving at the detectors from locations other than those determined by the length of drill pipe down the borehole.

It is another object of this invention to provide an improved method of determining the position of the bottom of the borehole without interrupting the drilling operations.

It is a further object of the present invention to provide an improved method and system for determining the position of the drill bit by utilizing coherent acoustical signals generated by rotating the bit against the formation being drilled and having such signals detected at the surface by a plurality of spaced detectors.

In operation, rotation of the drill bit against the formation being drilled generates coherent acoustical signals which are recorded at the surface of the earth by a plurality of spaced detectors. The signals recorded at each of the different detectors are time shifted relative to each other. These time shifts correspond to possible locations of the drill bit within the earth and are controlled to some degree by the length of drill pipe in the borehole. After the acoustical signals are shifted in time their coherency is determined. This procedure is repeated for a number of assumed locations of the drill bit. The drill bit position is determined to be at the location having the highest coherency value.

DETAILED DESCRIPTION OF THE INVENTION

Figure 1:
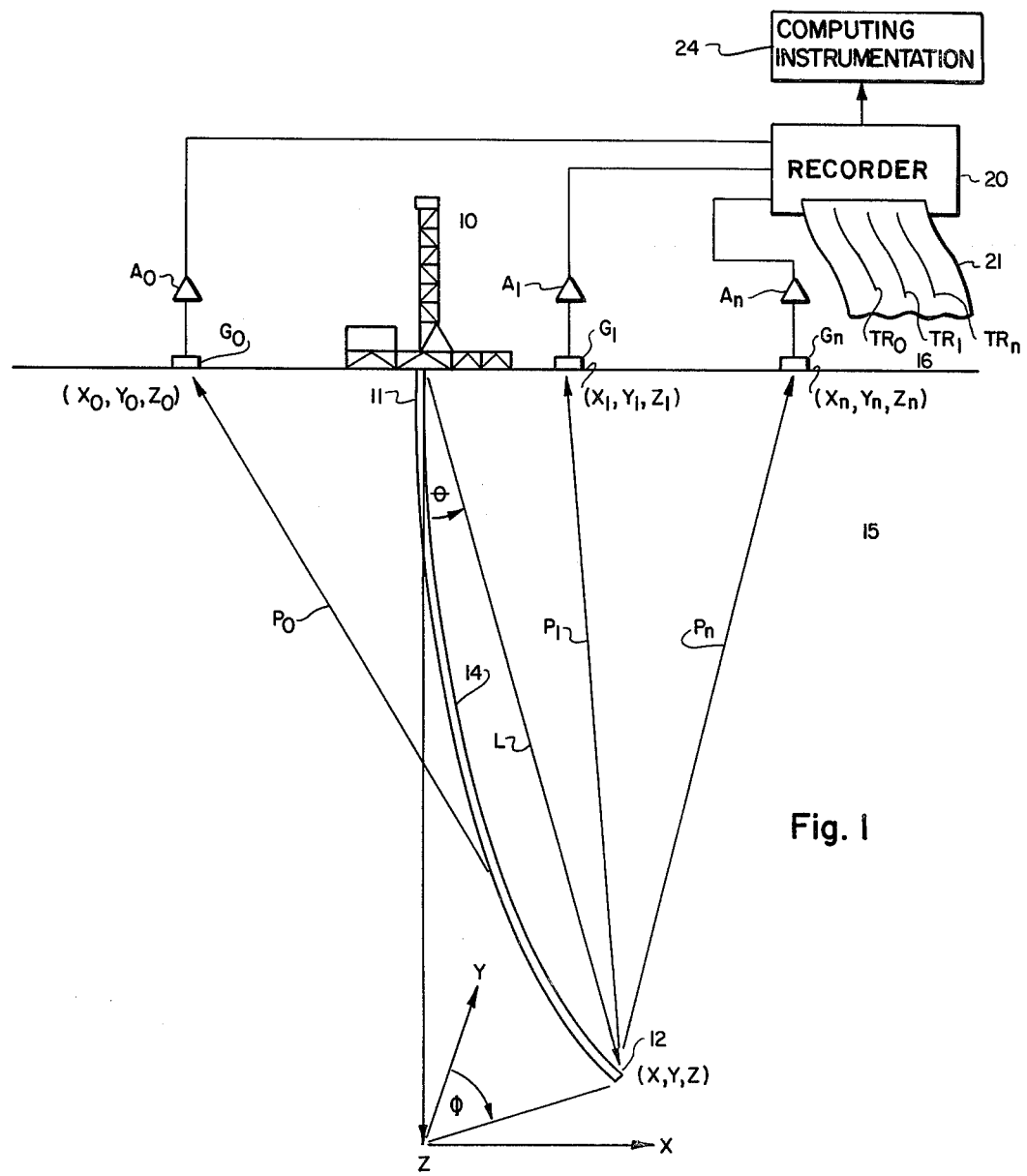
FIG. 1 illustrates a rotary drilling system and a plurality of spaced seismic detectors located at the surface of the earth and coupled to a recording system for detecting and recording acoustical signals generated by the drill bit down hole and hence near the bottom of the borehole.
Figure 2:
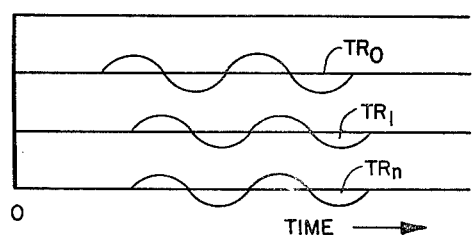
FIG. 2 illustrates waveforms detected and recorded by the detection and recording system of FIG. 1.

Referring now to FIGS. 1 and 2, there will be described the rotary drilling system. Shown is a cross section of the earth 15 with the earth's surface 16. The numeral 10 designates a derrick located over a borehole 11 that contains drill pipe 14 and a drill bit 12. The rate at which the drill bit 12 is rotated varies and may fall within the range for example of from 30 to 250 rpm. The borehole 11 is indicated as being curved and, therefore, the drill bit 12 is not always located below the derrick 10. The detecting system in one embodiment comprises three spaced seismic detectors (geophones) illustrated at $G_0, G_1, \ldots G_n$ and coupled to the ground for detecting elastic waves generated from the rotation of drill bit 12 against the formation being drilled and arriving at the detectors by way of travel paths depicted by arrows $P_0, P_1, \ldots P_n$. Although only three detectors are illustrated, it is understood that more may be employed. The outputs of the detectors are applied by way of amplifiers $A_0$ through $A_n$ to a recorder 20 which may record the outputs in digital or analog form. The recorder will show a record of continuous traces $TR_0, TR_1, \ldots TR_n$ corresponding generally to that shown in FIG. 2.

The detectors $G_0, G_1, \ldots G_n$ are spaced apart in a 2-dimensional surface array sufficient for the elastic waves generated by drill bit 12 to reach the detectors in a manner that phase differences in the recorded signals can be used to locate the drill bit 12. Hence, waveforms detected and recorded are compared to determine phase differences between the signals in order to determine and compute the position of the drill bit in the earth. The comparisons and computations may be carried out at the well site with the use of suitable electronic or digital computing instrumentation illustrated at 24. Hence, the position of the drill bit and thus the bottom of the borehole may be determined during drilling operations either continuously or at discrete intervals as the borehole is drilled. The detector positions $G_0, G_1, \ldots G_n$ may consist of several acoustical detectors (geophones) wired together and having a common output designed to attenuate unwanted surface noise generated from the drilling operations or from shallow sections of the drill pipe 14 rubbing against the borehole 11. The drill bit 12 may be coupled and decoupled or varied in rotational speed to produce variations in the recorded signal that would enhance the correlation process. The acoustic signal generated from action of the drill bit 12 on the formation being drilled consists of continuous and coherent waveforms containing a suite of frequencies traveling at the same velocity.

The computation scheme employed in determining the position of the drill bit relies on having a knowledge of the length of drill pipe 14 down the borehole. With this knowledge the surface detectors $G_0, G_1, \ldots G_n$ can be focused in a sense on selected positions within the earth controlled by the length of drill pipe 14 down borehole 11 and the probability that the drill bit 12 is located in one of the selected positions determined. Mathematically this can be achieved by the following set of steps:

First it is necessary to determine several assumed positions for the drill bit within the earth. Referring to FIG. 1 the position of the drill bit 12 is limited to those positions within the spherical coordinate system defined by the angles $\theta$ and $\phi$ and by the approximate length of drill pipe L. Thus, by holding one angle constant and incrementing the other angle in sequence a set of possible drill bit locations is determined. These can be transcribed into Cartisian coordinates by the relationships:

$X = L \sin \theta \sin \phi$
$Y = L \sin \theta \sin \phi$
$Z = L \cos \theta$

Next, the travel times $T_0, T_1, \ldots T_n$ along the seismic paths $P_0, P_1, \ldots P_n$ from point X,Y,Z at the drill bit to the various surface detector positions $G_0, G_1, \ldots G_n$ whose coordinates are defined as $(X_0, Y_0, Z_0)$, $(X_1, Y_1, Z_1), \ldots (X_n, Y_n, Z_n)$, respectively, are determined. By having a knowledge of the velocity V this relationship can be derived for the simple case of a halfspace by $$T_i = 1/V[(X-X_i)^2 + (Y-Y_i)^2 + (Z-Z_i)^2]^{\frac{1}{2}}$$

$i = 0, 1, \ldots n$

The next step is to time shift the waveforms recorded at each surface detector by the appropriate travel times $T_i$ for that detector position and test the coherency between waveforms. This is achieved by methods of either adding or multiplying the amplitude values of the shifted waveforms. The above procedure is repeated for various assumed positions of the drill bit. By introducing the proper phase shifts to each of the waveforms recorded for all possible locations of the drill bit and summing or multiplying the shifted time series one can expect high coherency or power values whenever the waveforms are aligned for the proper location of the drill bit and lesser coherency values as one moves away from the position of the drill bit. In this manner an array of acoustical detectors located at the surface of the earth can be focused on precise positions within the earth.

It is understood that variations of the above procedure may also be employed such as having prior knowledge of the depth of certain geologic boundaries and when the drill bit enters such a boundary substituting this depth value for the length of drill pipe in the above computation. An iteration scheme in which the recorded traces are shifted relative to each other and coherencies calculated can also be employed. The travel times associated with the highest coherency value could be used to determine the location of the drill bit.

In the past, many people have tried to record the noises made while the well is being drilled, as an indication of the point at which the drilling operation is actually taking place. These have always been unsatisfactory because of the noise generated by the rotation of the drill pipe along the whole length of the borehole, as well as noise generated at the surface from drilling operations that could not be separated from the noise of the drill bit. The improvement of this invention is in the method of focusing the array of surface detectors to precise locations within the earth. These locations are controlled by the length of drill pipe down the borehole.

It is understood that the invention is not to be limited to the specific embodiments set forth herein by way of exemplifying the invention, but the invention is to be limited only by the scope of the attached claim or claims, including the full range of equivalency to which each element or step thereof is entitled.

I claim:

1. A method for locating the position of a continuously rotating drill bit in a borehole without interrupting drilling operations comprising the steps of:

continuously rotating said drill bit against the formation being drilled to generate a drill bit acoustic signal;

positioning an array of seismic detectors at or near the surface of the earth to detect said drill bit acoustic signal generated by said continuously rotating drill bit;

determining the approximate depth of said drill bit in the borehole;

assuming a set of positions for said drill bit as a function of the approximate depth of said drill bit;

selecting one assumed position for said drill bit and calculating the travel times for the drill bit acoustic signal generated by said continuously rotating drill bit from said one assumed position to each of said seismic detectors;

time shifting the drill bit acoustic signals detected by each seismic detector relative to a time reference by an amount corresponding to the calculated travel time of the drill bit acoustic signal generated by said continuously rotating drill bit from said one assumed position to said seismic detectors;

correlating the time shifted drill bit acoustic signals for said one assumed position of said drill bit by calculating a coherency value representing the coherency of the time shifted acoustic signals;

selecting other assumed positions in the set of assumed positions for said drill bit and repeating the steps of calculating the travel times, time shifting the drill bit acoustic signals and correlating the time shifted acoustic signals for each assumed position to obtain a set of coherency values corresponding to the set of assumed positions for said drill bit; and comparing the coherency values corresponding to the set of assumed positions for said drill bit to determine the location of said drill bit.

2. The method according to claim 1 wherein the acoustic signal generated by the continuous rotation of said drill bit against the formation is segregated from other acoustic signals by the steps of selecting assumed positions for said drill bit, time shifting the acoustic signals detected by said seismic detectors, correlating the time shifted acoustic signals and comparing the coherency values.

3. The method according to claim 1 wherein the steps of time shifting the acoustic signals, correlating the time shifted acoustic signals and comparing the coherency values are carried out by a computer at the well site in real time.

4. The method according to claim 1 wherein the acoustic signal generated by the drill bit is coherent and has a continuous waveform.

5. The method according to claim 1 wherein the acoustic signal generated by the drill bit may be varied by varying the rotational speed of said drill bit.

6. The method according to claim 1 wherein the steps of selecting assumed positions for said drill bit, time shifting the acoustic signals, correlating the time shifted acoustic signals and comparing the coherency values are performed at discrete intervals at the well site in real time.

7. The method according to claim 1 wherein the steps of selecting assumed positions for said drill bit, time shifting the acoustic signals, correlating the time shifted acoustic signals and comparing the coherency values are performed continuously at the well site in real time.

8. The method according to claim 1 wherein the step of correlating the time shifted acoustic signals is performed by adding and/or multiplying the amplitude values of the time shifted acoustic signals.

9. The method according to claims 1 or 8 wherein the location of said drill bit corresponds to the highest coherency value of the set of coherency values.

10. The method according to claim 1 wherein said drill bit is rotated by a drilling rig including a drill string and the depth of said drill bit in the borehole is estimated as a function of the known length of the drill string.

11. The method according to claim 1 wherein the depth of said drill bit in the borehole is determined as a function of the known depth of geologic boundaries.

12. The method according to claim 1 wherein said seismic detectors are spaced apart in a two-dimensional array.

13. The method according to claim 12 wherein said array of seismic detectors includes at least three seismic detectors.

14. The method according to claim 1 further comprising the step of recording the acoustic signals detected at each seismic detector.

15. In a drill bit location system for a rotary drilling rig, said rotary drilling rig including a drill string and a drilling mechanism to rotate said drill string and an associated rotatable drill bit to drill a borehole, said drill bit location system including an array of spaced seismic detectors to detect seismic signals and signal processing means coupled to said seismic detectors for processing the seismic signals, a method for locating the position of said rotatable drill bit in the earth during continuous rotation of said rotatable drill bit in the borehole, said method comprising the steps of:

detecting a drill bit acoustic signal emanating from said rotatable drill bit during continuous rotation of said rotatable drill bit against the formation being drilled, the drill bit acoustic signal being detected by said array of seismic detectors;

positioning said array of seismic detectors to obtain phase differences in the drill bit acoustic signal detected at different seismic detector positions;

determining a set of assumed positions for said rotatable drill bit utilizing known information about the approximate depth of said drill bit;

calculating the travel times for the drill bit acoustic signal from one of the assumed positions for said rotatable drill bit to each of said seismic detectors in said array of seismic detectors;

segregating the drill bit acoustic signal from other acoustic signals detected by said seismic detectors by (1) time shifting the acoustic signal detected by each of said seismic detectors relative to a time reference by an amount corresponding to the calculated travel time of the drill bit acoustic signal from said one assumed position to said seismic detector and (2) correlating the time shifted acoustic signals for said one assumed position of said rotatable drill bit by calculating a coherency value representing the coherency of the time shifted acoustic signals;

repeating the steps of calculating travel times of the drill bit acoustic signal and segregating the drill bit acoustic signal from other acoustic signals for each assumed position for said rotatable drill bit; and comparing the coherency values for all assumed positions for said rotatable drill bit to determine the location of said rotatable drill bit.

16. The method according to claim 15 wherein the step of segregating the drill bit acoustic signal from other acoustic signals is carried out by a computer at the well site in real time.

17. The method according to claim 15 wherein the drill bit acoustic signal is coherent and has a continuous waveform.

18. The method according to claim 15 wherein the drill bit acoustic signal may be varied by varying the rotational speed of said rotatable drill bit.

19. The method according to claim 15 wherein the steps of determining assumed positions for said rotatable drill bit, calculating travel times, segregating the drill bit acoustic signal from other acoustic signals and comparing coherency values are performed at discrete intervals at the well site in real time.

20. The method according to claim 15 wherein the steps of determining positions for said rotatable drill bit, calculating travel times, segregating the drill bit acoustic signal from other acoustic signals and comparing coherency values are performed continuously at the well site in real time.

21. The method according to claim 15 wherein correlation of the time shifted acoustic signals is performed by adding and/or multiplying the amplitude values of the time shifted acoustic signals.

22. The method according to claims 15 or 21 wherein the location of said rotatable drill bit corresponds to the highest coherency value of the set of coherency values.

23. The method according to claim 15 wherein the approximate depth of said drill bit in the borehole is a function of the known length of the drill string.

24. The method according to claim 15 wherein the approximate depth of said rotatable drill bit in the borehole is a function of the known depth of geologic boundaries.

25. A method for locating the position of a continuously rotating drill bit in a borehole comprising the steps of:
- continuously rotating said drill bit against the formation being drilled to generate a drill bit acoustic signal;
- positioning an array of seismic detectors at or near the surface of the earth to detect the drill bit acoustic signal, said array of seismic detectors being positioned to obtain phase differences in the drill bit acoustic signal detected by said seismic detectors;
- determining the approximate depth of said drill bit in a borehole;
- assuming a set of positions for said drill bit as a function of the approximate depth of said drill bit;
- segregating the drill bit acoustic signal from other acoustic signals detected by said seismic detectors in accordance with the following steps:
  - selecting one assumed position for said drill bit and calculating the travel times for the drill bit acoustic signal from said one assumed position to each of said seismic detectors;
  - adjusting the time reference of the acoustic signals detected by each seismic detector by an amount corresponding to the calculated travel times for said seismic detector for said one assumed position of said drill bit;
  - correlating the adjusted acoustic signals for said one assumed position of said drill bit by calculating a coherency value representing the coherency between the adjusted acoustic signals;
  - selecting other assumed positions in the set of assumed positions for said drill bit and repeating the steps of calculating the travel times, adjusting the time reference to the acoustic signals and correlating the adjusted acoustic signals for each assumed position to obtain a set of coherency values corresponding to the set of assumed positions for said drill bit; and
  - comparing the coherency values for the set of assumed positions for said drill bit to segregate the drill bit acoustic signal; and
- identifying one of the assumed positions for said drill bit as the location of said drill bit in accordance with the coherency values calculated in said segregating step.

26. The method according to claim 25 wherein the step of segregating the drill bit acoustic signal from other acoustic signals is carried out by a computer at the well site in real time.

27. The method according to claim 25 wherein the step of correlating the adjusted acoustic signals is performed by adding and/or multiplying the amplitude values of the adjusted acoustic signals.

28. The method according to claim 25 wherein the step of adjusting the time reference of the acoustic signals is performed by time shifting the acoustic signals by an amount corresponding to the calculated travel times.

29. The method according to claim 25 wherein the location of said drill bit corresponds to the highest coherency value of the set of coherency values.

30. The method according to claim 25 wherein said drill bit is rotated by a drilling rig including a drilling string and the depth of said drill bit in the borehole is estimated as a function of the known length of the drill string.

* * * * *